United States Patent [19]

Dürig et al.

[11] Patent Number: 5,025,147
[45] Date of Patent: Jun. 18, 1991

[54] SENSOR FOR CONVERTING A DISTANCE TO OPTICAL AND FURTHER TO ELECTRICAL ENERGY, AND SURFACE SCANNING APPARATUS USING SAME

[75] Inventors: Urs T. Dürig, Rüschlikon, Switzerland; Ulrich C. Fischer, Wetzlar, Fed. Rep. of Germany; Wolfgang D. Pohl, Adliswil, Switzerland

[73] Assignees: Ernst Leitz Wetzlar, GmbH, Wetzlar, Fed. Rep. of Germany; International Business Machines Company, Armonk, N.Y.

[21] Appl. No.: 247,706

[22] Filed: Sep. 22, 1988

[30] Foreign Application Priority Data

Sep. 25, 1987 [EP] European Pat. Off. ........ 87114008.3

[51] Int. Cl.$^5$ .............................................. H01J 3/14
[52] U.S. Cl. .................................... 250/216; 250/306
[58] Field of Search ............... 250/216, 227, 215, 239, 250/492.1, 491.1, 306, 307, 310, 311; 350/319, 507, 521, 534

[56] References Cited

U.S. PATENT DOCUMENTS 4,343,993  8/1982  Binnig et al. ...................... 250/306
4,604,520  8/1986  Pohl ................................... 250/216

*Primary Examiner*—David C. Nelms
*Attorney, Agent, or Firm*—Helfgott & Karas

[57] ABSTRACT

In an apparatus for sensing a distance between a sensor and a surface of a body being measured, a sensor body of the sensor is formed as a light waveguide for laser light. A light exit site for light diffracted within the sensor body is located at a surface thereof which faces away from the measured body. A detection particle is located at the surface of the sensor body, which faces the measured body. The detection particle has a substantially convex and rounded off form and a major dimension which is smaller than the wavelength of the light. The measured body is located in the optical near field of the detection particle. A detector device converts the optical energy of the diffracted light into an electrical detector signal. A continuous thin film is provided as a coating on the sensor. It substantially covers the detection particle and at least a part of the surface of the sensor body in the vicinity of the detection particle. The film has a thickness which is smaller than one half of a predetermined wavelength. The sensor is used to finally convert a distance value into an electrical value.

32 Claims, 4 Drawing Sheets

SENSOR FOR CONVERTING A DISTANCE TO OPTICAL AND FURTHER TO ELECTRICAL ENERGY, AND SURFACE SCANNING APPARATUS USING SAME

BACKGROUND OF THE INVENTION

This invention relates to an optical sensor for converting a distance value to a quantity of optical energy while using laser light of a predetermined wavelength and for converting said quantity of optical energy to an electrical value. Also, this invention relates to an apparatus for scanning the surface of a measured body by means of said sensor.

A sensor of the type mentioned above has been disclosed, for instance by J. Wessel in his publication "Surface Enhanced Optical Microscopy" in J. Opt. Soc. Am. B 2/9 (1985) 1538-1540. In operation, this known sensor is making use of surface plasmons or more generally of polaritons, which have been defined for instance by H. Raether in Spring Tracts in Modern Physics 88 (1980) 165. The principle of operation of this known sensor is based on the modification of Raman scattering by effects which have been discussed for instance by J. Gersten and A. Nitzan in their publication "Electromagnetic Theory of Enhanced Raman Scattering by Molecules Adsorbed on Rough Surfaces" in J. Chem. Phys. 73/7 (1980) 3023-3037, or also by R. Ruppin in his publication "Electric Field Enhancement Near a Surface Bump" in Solid State Comm. 39/8 (1981) 903-906, P.F. Liao and A. Wokaun in their publication "Lightning Rod Effect in Surface Enhanced Raman Scattering" in J. Chem. Phys. 76/1 (1982) 751-752, or A. Wokaun, J. P. Gordon and P. F. Liao in their publication "Radiation Damping in Surface-Enhanced Raman Scattering" in Phys. Rev. Lett. 48/14 (1982) 957-961.

Scanning apparatus for scanning the surface of a measured body by means of prior art sensors using electromagnetic effects has been disclosed, for instance by C. C. Williams and H. K. Wickramasinghe in their publication "Scanning Thermal Profiler" in appln. Phys. Lett. 49/23 (1986) 1587-1589.

Further related literature is, for instance "A New Geometry for Field Enhancement in Surface-Enhanced Spectroscopy" by P. K. Aravind, R. W. Rendell and H. Metiu in Chem. Phys. Lett. 85/4 (1982) 396-403, "Surface Shape Resonances" by P. C. Das and J. I, Gersten in Phys. Rev. 25/10 (1982) 6281-6290, and "Surface Modes and Optical Absorption of a Small Sphere Above a Substrate" by R. Ruppin in Surface Science 127 (1983) 108-118.

It has also been disclosed in EP-A-0112402 and in EP-A-0185782 to partly coat a light waveguide with a metal thin film and to use said light waveguide in a near-field optical application. However, said metal coating has never been provided on the tip of said light waveguide: nay, in EP-A-0185782 it is explicitly disclosed to provide apertures on the waveguide in order not to cover its tip located next to an object to be inspected, while in EP-A-0112402 it is explicitly disclosed to plastically deform the metallization so as to expose a tiny aperture for the same purpose.

From this prior art it is known to provide an uninterrupted light path through successive dielectric media, from the sensor to the object to be inspected, and to prevent any metallic medium from being interposed on said light path or, if any metallic medium is interposed, to remove it. Clearly, it follows therefrom that the phenomenon put to use in said prior art is the Raman effect or, in some cases, the diffusion of light.

The main drawback of this prior art is that reflected light cannot readily be separated from scattered light, whether it is Raman scattered or diffused. This lack of a simple separation means or method entails a loss of sensitivity of the method as well as major experimental problems which arise when the principles which this prior art is based on are put to use. Indeed, although these principles have already been known for years, no efficient reduction to practice or workable application has been obtained up to now.

SUMMARY OF THE INVENTION

Thus, it is an object of the instant application to provide a sensor and an apparatus for using same, in which the reradiated light is easily and efficiently separated from the incident light and, consequently, whose sensitivity for converting a distance value to a quantity of optical energy and for converting the latter to an electrical quantity value is higher than in the prior art devices.

This object and others which will readily appear from the following description, are attained by a sensor which comprises a detection particle which is coated with a thin metal film. The bulk material of the detection particle may be dielectric, semiconductor or metallic material. The metallization of the particle surface results in a strong field enhancement of the electromagnetic near field surrounding the particle, this enhancement being due to the large curvature of the particle surface and the tendency of electrical field lines to orient themselves perpendicular to a conducting surface (this is the lightning rod effect discussed in some of the literature quoted above). The incident radiation further can excite localized plasma resonances in the particle. This results in an enhancement of radiation from the particle, and an enormous field enhancement of up to 100,000 times is created in the vicinity of the particle when such resonances combine with the lightning rod effect. Of course such enhancement effects are completely absent in prior art sensors, whose detection particles have no metal film coating thereon and are not formed of metal.

The enhancement is strongest if the incident radiation excites a plasmon in the metal film or particle, and when the film and particle resonances are matched.

In order to satisfy the first requirement, particle shapes and sizes and film thicknesses must be chosen which make the plasma resonances occur, in both the particle and the film, at same values of the frequency-dependent dielectric constant. For a thin film, the condition at which the resonance appears is a function of the complex refractive index of the film, its thickness, and the refractive index of the film substrate. If the particle is formed of a dielectric material and its shape is nearly spherical, there are several complex dielectric constants at which the resonance appears, due to the existence of several resonance modes. The desired match is further facilitated by the fact that in a metal the plasma resonances are fairly broad. If the particle is formed of a metal, particle shapes and sizes and film thicknesses must be chosen which make the plasma resonances occur.

In order to satisfy the second requirement, the frequency and wave vector of the injected light and of the plasmon have to be matched. For visible light this condition can be satisfied with metals having a low plasma frequency such as copper, silver or gold. In case a metal film is used the medium adjacent to the metal film on one side thereof must have a refractive index which is sufficiently different from unity, as in the case of glass. The match can then be made by appropriately adjusting the angle of incidence. Plasmon excitation manifests itself by reduced reflection and strongly enhanced scattering at the detector particle.

The resonance frequency and damping both depend on the optical properties of the environment of the detector particle. The effective resonant dielectric constant of a metal coated sphere above a plane, whether the latter is dielectric or metallic, shows a rapid change when the plane is less than half a radius away from the surface of the sphere. In the present instance said metal coated sphere corresponds to the detector particle and said plane corresponds to the surface of the measured body. When the detector particle is excited by light and the distance from the surface of the measured body to the detector particle is varied this entails a detuning of the resonance which is observable. If the coupling of the light to the plasmon was optimum prior to moving the detector particle closer to the surface of the measured body, a sharp decrease of the scattered intensity occurs at a critical distance where the resonant dielectric constant begins to vary. If the coupling of the light to the plasmon was somewhat detuned in the appropriate direction prior to moving the detector particle closer to the surface of the measured body, the system can be observed first to go through resonant conditions resulting in a sharp scattering peak and then to show the same sharp decrease of the scattered intensity as said above.

Either the peak or the slope of the resulting resonance curve may be used to stabilize the distance between the detector particle and the surface of the measured body. There is some analogy between this application and the operative concept of the "scanning tunneling microscope" (STM) known for instance from U.S. Pat. No. 4,343,993, so that, when operated in this mode, the surface scanning apparatus using the sensor of the invention could also be called an "optical tunnel microscope" (OTM). In analogy to the STM, the sensor positioning signal in the OTM is a mixed function of topographical information and optical properties vs. position, and again in analogy to the STM, these two variables can be separated by distance modulation in the OTM. However, the range and precision which can be attained with the OTM and STM are very different. The OTM provides a range of distances between the detector particle and the surface of the measured body which is typically of 1 to 50 nm, and allows to attain a precision of about 0.1 nm in distance control. Thus, the range of the OTM is 10 to 100 times larger than the range of the STM, and the precision is lower, respectively. A lateral resolution of the order of 10 nm can be achieved. It depends on the size of the sensor particle and on the radius of curvature of its lowest part.

As a result, when operated in the OTM manner the surface scanning apparatus of the present invention allows to examine surfaces for which the STM is not optimally suited. In the range where both the STM and the OTM are operable, the OTM allows to attain a larger scan range with a faster scanning and it is less sensitive to perturbations. Moreover, the OTM is not restricted as the STM to using a measured body having a conducting surface.

Further applications of the surface scanning apparatus of the present invention when used in other modes of operation are the following:

The surface scanning apparatus of the present invention can be used as a write/read head for optical storage means. In a miniaturized embodiment, the optical sensor will be flown over a rotating optical disk. The distance will be controlled in order to maintain the average scattered intensity at a predetermined value. Reading operation will be achieved by recording the fluctuations of the scattered intensity. For use with magneto-optic or electro-optic recording materials, sensitivity to varying birefringence will be achieved by incorporating appropriate polarizers into the path of the detected light. Writing operation will be achieved by increasing the intensity excitation in a manner similar to that which is used in conventional optical storage devices. The bit size can be restricted to 100 nm or less, so that much larger storage densities will be attainable than have been conceived so far.

The surface scanning apparatus of the present invention can also be used in a distance regulated head/disk assembly. An optical sensor will be incorporated into a magnetic read/write head for achieving an active control of the height of the flying head over the disk. The principle of this height control is known in relation with similar surface scanning apparatus in which a tunnel effect sensor is used. The advantage of the surface scanning apparatus of the present invention will be that the large operating range of its optical sensor makes movements much less critical to evasion than with the tunnel effect sensor.

The surface scanning apparatus of the present invention can also be used in a device for following or testing a line. Because of its sensitivity to variations of optical properties, the optical sensor will be operated to track for instance a metallic line on an integrated circuit. In this application, insulating layers having a thickness of less than 50 nm will raise no tracking problems. Defects of the line being tracked will be detected as an equivalent of variations in topography or optical properties.

The aforementioned objects, features and advantages of the invention, will, in part, be pointed out with particularity, and will, in part, become obvious from the following more detailed description of the invention, taken in conjunction with the accompanying drawing, which forms an integral part thereof.

BRIEF DESCRIPTION OF THE DRAWINGS

In the drawing.

In the various figures of the drawings like reference numerals designate like parts.

DETAILED DESCRIPTION OF THE PREFERRED EMBODIMENTS

Figure 1:
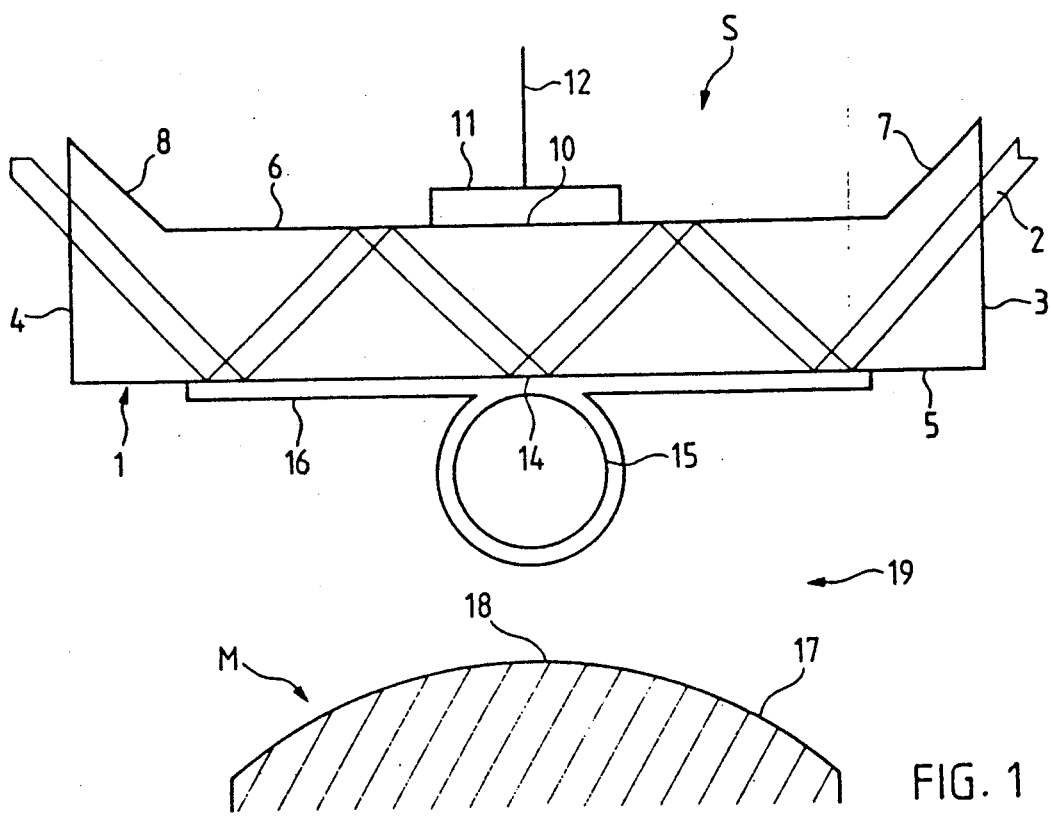
FIG. 1 shows a schematic view of a first embodiment of an optical sensor according to the present invention and a portion of a body to be measured with the sensor.

With reference to FIG. 1, an optical sensor S is shown schematically and is comprised of a sensor body 1 which is transparent to a laser light 2. The wavelength of the laser light 2 is selected in relation with the choice of other parameters, as will appear from the description which follows, and is preferably selected within the visible light spectrum.

The sensor body 1 is formed as a light waveguide for the laser light 2. In the exemplary embodiment of FIG. 1, this light waveguide has a substantially prismatic form with a substantially rectangular cross section, but it should be understood that any other cross section may be used which gives the sensor body 1 a light waveguide effect. The sensor body 1 is bounded in vertical direction by a lower surface 5 and an upper surface 6, both of which are substantially plane in this embodiment shown in FIG. 1. The sensor body 1 also has a light entrance site 3 and a first light exit site 4 each formed as a substantially plane surface.

To facilitate the injection of the laser light 2 into the sensor body 1 at the light entrance site 3 and the extraction of the light guided through the sensor body 1 at the first light exit site 4, the cross section of the sensor body 1 is enlarged in the vicinity of the respective sites 3 and 4. For instance, the cross section of the sensor body 1 may be made to gradually increase in height towards the respective sites 3 and 4 by deviating end portions of the upper surface 6 of the sensor body 1 upwards as shown in FIG. 1 by reference numerals 7 and 8.

At the sensor body 1 there is provided a second light exit site 10 for light diffracted within the sensor body 1. This second light exit site 10 is located at the upper surface 6, for instance substantially in the middle thereof and is equally spaced from the respective entrance and first exit sites 3 and 4.

A detector means 11 is provided for converting the optical energy of that light portion which leaves the sensor body 1 at the second light exit site 10 to an electrical detector signal delivered to an electrical line 12. The detector means 11 and line 12 are shown schematically, as they are well known in the art of photodetecting elements.

In the exemplary embodiment of FIG. 1, the detector means 11 is arranged at the upper surface 6 of the sensor body 1 adjacent to the second light exit site 10. However, the detector means 11 can be arranged in other manner at the sensor body 1 to obtain the required light transmission from the sensor body 1 to the detector means 11.

Figure 2:
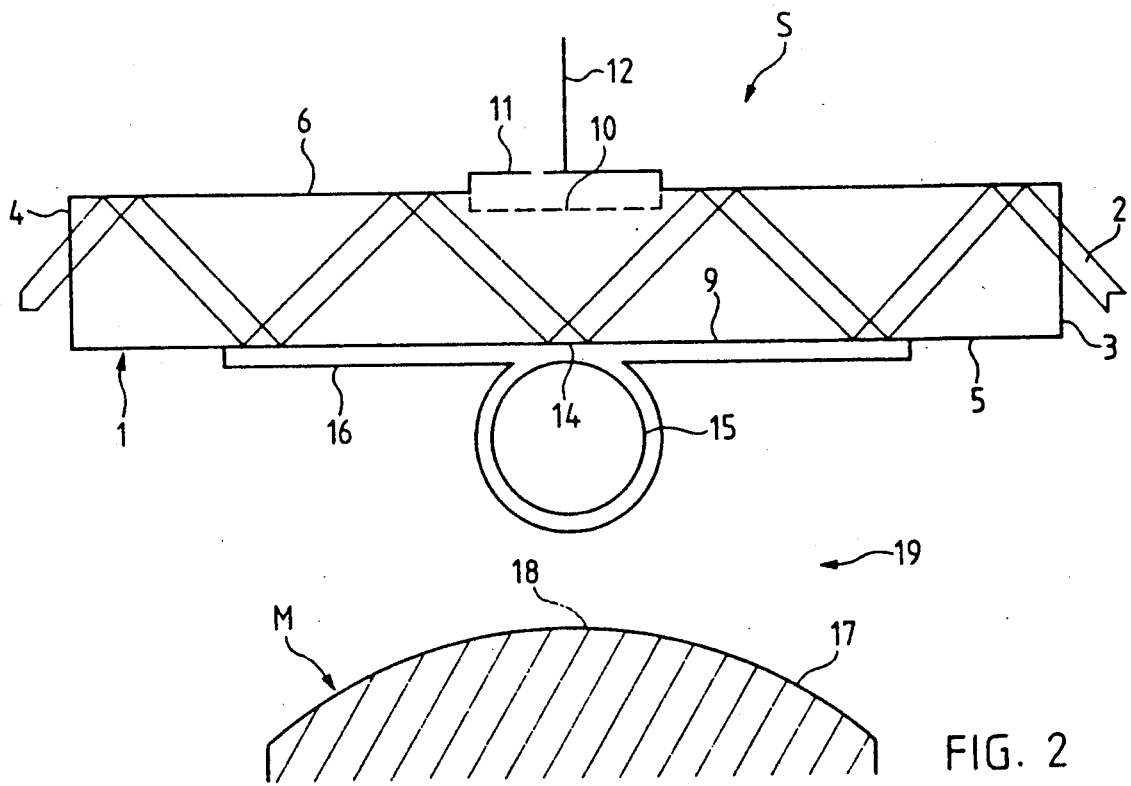
FIG. 2 shows a schematic view of a second embodiment of an optical sensor according to the present invention.

In the exemplary embodiment of FIG. 2, the detector means 11 is shown to be located at least in part within the sensor body 1, and it is formed as an integral part thereof in vicinity of the upper surface 6 thereof.

These embodiments of FIGS. 1 and 2 are particularly useful if, for instance, the material of the sensor body 1 is a semiconductor in which and/or on which the detector means 11 may be formed, for instance by epitaxial and/or diffusion and/or other techniques known in the art of making and using semiconducting devices.

Figure 3:
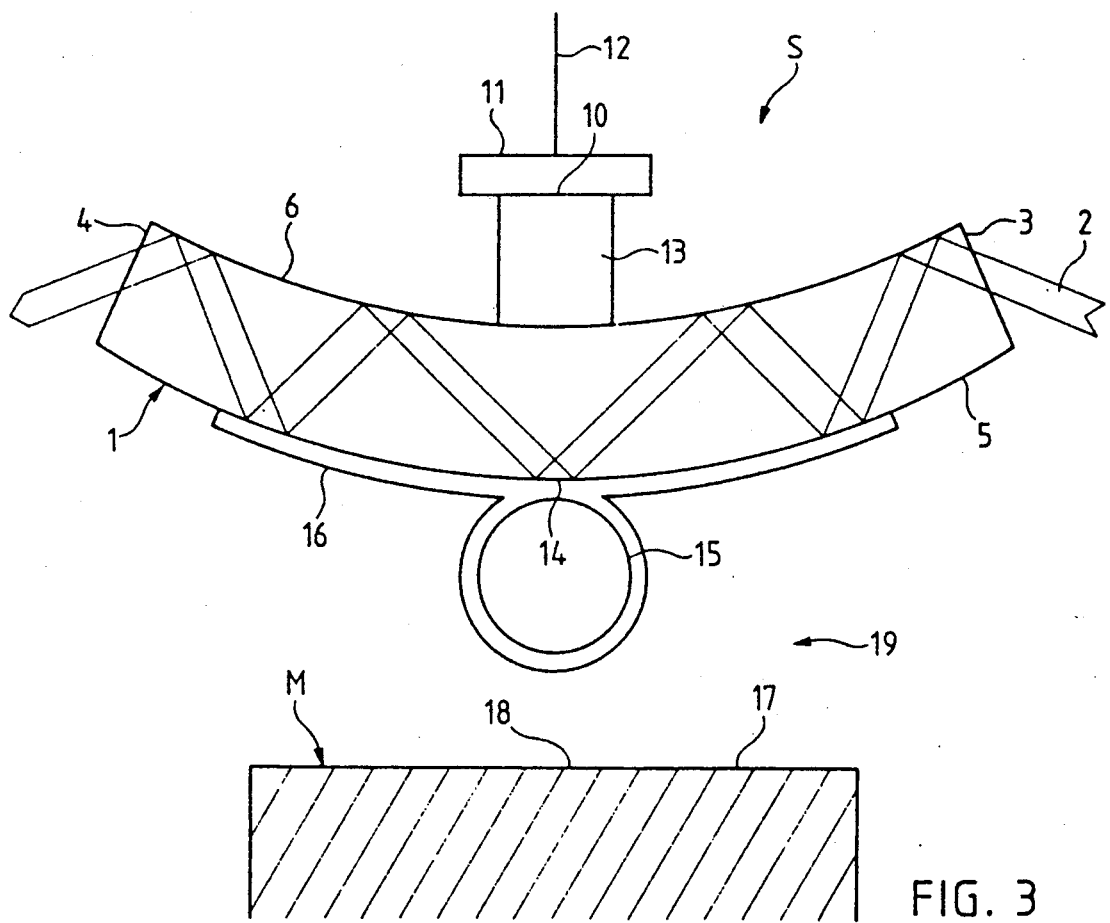
FIG. 3 shows a schematic view of a third embodiment of an optical sensor according to the present invention.

In the exemplary embodiment of FIG. 3, the detector means 11 is shown to be spaced from the sensor body 1 and linked thereto at the second light exit 10 site by means of a light waveguide 13.

Again with reference to FIG. 1, a reference site 14 is defined at the lower surface 5 of the sensor body 1, for instance substantially in the middle thereof and equally spaced from the respective entrance and first exit sites 3 and 4. In each instance, the reference site 14 is essentially located opposite the second light exit 10 site, so that the respective sites 14 and 10 are facing each other across the sensor body 1.

A detection particle 15 is located adjacent to the sensor body 1 at the reference site 14. It has a substantially convex and rounded off form. The major dimension of the detection particle 15 is smaller than half the wavelength of the laser light 2, this major dimension being for instance its diameter if the particle is formed substantially as a sphere, or its major axis if the particle is formed substantially as an ellipsoid, or its height if the particle is formed substantially as a cone or a pyramid. Depending on said wavelength, the detection particle can have a major dimension of 5 to 500 nm and preferably of 20 to 100 nm.

The detection particle 15 may be formed of a dielectric material, as shown in FIG. 1, in which case it may be particularly convenient and therefore it is preferred that the detection particle be a latex spherule. However, the detection particle 15 may also be formed of a metal in which light absorption due to the excitation of plasmons or polaritons can be obtained at the wavelength of the laser light 2, and in this case the detection particle 15 may be coated with the same or another metal. These cases are shown in FIGS. 2 and 3.

In each case, the material which the detection particle 15 is made of, the major dimension of the latter and the wavelength of the laser light 2 to be used are selected in consideration of each other in such manner that light absorption due to the excitation of plasmons or polaritons can be obtained in the detection particle 15 at the chosen wavelength. The proper combination of material, major dimension and wavelength may be determined according to the teachings of H. Raether, of P. K. Aravind, R. W. Rendell and H. Metiu and of P. C. Das and J. I. Gersten which have been quoted above, and/or by measurements known in the art, such as measurements of attenuated total reflection (ATR mentioned by P. K. Aravind, R. W. Rendell and H. Metiu) in combination with statistical measurements of the light intensity scattered at layers formed by the particles of concern dispersed on a glass substrate: the observed reflectivity is indicative of surface plasmons and the scattered intensity is indicative of localized plasmons.

A continuous thin film 16 is deposited onto the lower part of the sensor S to form a coating thereon. The thin film 16 is made to cover the detection particle 15 almost completely, i.e. substantially everywhere except possibly in the immediate vicinity of the reference site 14, at which location the detection particle 15 contacts the lower surface 5 of the sensor body 1. Also, the thin film 16 covers at least part of the lower surface 5 of the sensor body 1 in the vicinity of the reference site 14, up to a radial distance thereof which is a multiple of the wavelength of the laser light 2, for instance a dozen wavelengths or more. In practice, it is irrelevant to the applicability of the sensor S to make the thin film 16 cover the lower surfaces 5 either partly or completely, except for the minimum coverage around the reference site 14 as has been said above. Apart from its optical function which will be described below, the thin film 16 is helpful in maintaining the detection particle 15 securely affixed at the lower surface 5 of the sensor body 1.

The thin film 16 may be formed of a metal in which light absorption due to the excitation of plasmons or polaritons can be obtained at the wavelength of the laser light 2. The thickness of the thin film 16 is smaller than half the wavelength of the laser light 2. Depending on said wavelength, the thin film 16 can have a thickness of 5 to 100 nm. The thickness must be shown sufficient to allow for a continuous film devoid of any islands which would be non-contiguous with each other (in order to avoid any confusion, it is stressed that this latter condition is exactly opposite to the condition for observing the above-mentioned scattered intensity on layers of particles dispersed on a substrate).

From the explanation given above in respect of how to select a suitable size and material of the detection particle 15 and of the thin film 16, it will appear that in a preferred embodiment of the invention the sensor S is adapted to be used with a laser light 2 whose wavelength is selected within the visible light spectrum. Then, the thin film 16 of this sensor S may be formed of a metal selected from gold, silver and copper, and more preferably the thin film of this sensor S is formed of gold and has a thickness of less than 100 nm. The detection particle 15 of this sensor S may be formed of latex or some other dielectric material, or of a metal selected from gold, silver and copper and has a major dimension of 5 to 500 nm or preferably of 20 to 100 nm, depending on said wavelength.

Again with reference to FIG. 1, a measured body M is shown, whose surface 17 is to be measured at a measurement site 18. The measurement site 18 is located opposite the sensor S. More precisely, the surface 17 of the measured body M and the lower surface 5 of the sensor body 1 are facing each other, a space 19 being defined therebetween. The measurement site 18 is located opposite the reference site 14 at a distance therefrom. This distance, i.e. the space 19, is small enough for the sites 14 and 18 to be located, at the wavelength of the laser light 2, in the optical near field of each other. The measurement site 18 is therefore located within the space 19 in the optical near field of the detection particle 15.

The sensor S is adapted to convert a value of the above distance between the measurement site 18 and the reference site 14 to a quantity of optical energy: this first conversion is obtainable by means of the detection particle 15. The sensor S is also adapted to convert said quantity of optical energy to an electrical quantity: this second conversion is performed by the detector means 11, which receives said quantity of optical energy from the sensor body 1 at or from the second light exit 10 site thereof and is, for this purpose, located at the surface of the sensor body 1 on the side thereof which faces away from the measured body M.

As a matter of fact, the effect which the invention makes use of is essentially related to the detection particle 15. The contribution of that part of the thin film 16 which coats the lower surface 5 of the sensor body 1 mainly resides in an improved separation of the incident light from the light scattered at the detection particle 15. In this sense, the detection particle 15 is acting as an antenna, the energy of which is transferred to the detector means 11. This antenna effect is improved if the surface 17 of the measured body M and the lower surface 5 of the sensor body 1 are not parallel to each other, the space 19 defined therebetween having a width which is minimum in the vicinity of the detection particle 15.

To further promote this antenna effect, if the surface 17 of the measured body M is substantially plane, it is preferred to use a sensor S having a lower surface 5 which is convex towards the measured body M. In the simplest version of this embodiment, which is shown in FIG. 3, the sensor body 1 is formed as a curved waveguide having a lower surface 5 which is substantially spherical at least in the vicinity of the detection particle 15, and a corresponding upper surface 6. Of course, other types of curvature of the lower surface 5, together with a plane upper surface 6, may also be used, if appropriate to form the sensor body 1 as a waveguide: for instance, the surface 6 may have an ellipsoidal curvature, or the sensor body 1 may be given a generally convex form.

If the surface 17 of the measured body M is substantially convex towards the sensor S, the sensor S may have a lower surface 5 which either is plane, a shown in FIG. 1, or it may be formed to have at least one straight generatrix 9 passing through the reference site 14, as shown in FIG. 2. In this latter embodiment, the sensor body 1 is of generally cylindrical form having a cross section which may be for instance elliptical or polygonal, as may be appropriate to forming the sensor body 1 as a rod-like or fiber-like waveguide.

Also in order to enhance the antenna effect of the detection particle 15, it is preferred that the laser light 2 directed to enter the sensor body 1 at the light entrance site 3 be p-polarized, i.e. polarized in a plane which is normal to the lower surface 5 of the sensor body 1.

The antenna effect of the detection particle 15 at the sensor S is observable if the measured body M is formed of metal or of semiconductor material. However, the antenna effect is best observed if the measured body M is formed of bulk dielectric material or is comprised of a layer of dielectric material coating a measured body which then may be formed of bulk metal. The latter combination of materials allows for electro-optical and magneto-optical applications, also making use, for instance, of induced birefringence.

The space 19 between the sensor S and the measured body M may be evacuated or filled with a gas such as air. It may, however, be filled with any substance whose refractive index is distinctly lower than that of the sensor body 1, which condition allows for the sensor body 1 to exert the desired waveguide action.

Figure 4:
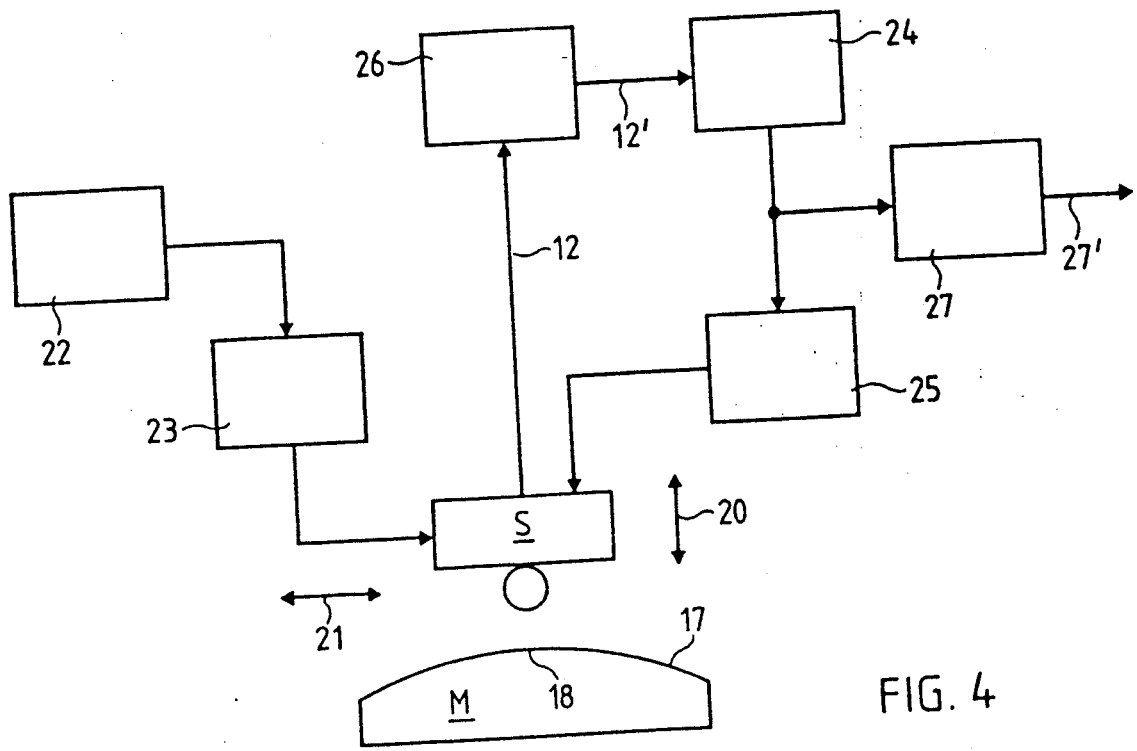
FIGS. 4, 5, 6 and 7 each show a schematic view of one of four alternative embodiments of a surface scanning apparatus according to the present invention.

A first embodiment of a surface scanning apparatus according to the invention is schematically shown in FIG. 4.

In respect of the surface 17 of the measured body M a measuring direction 20 is defined which, in the vicinity of the measurement site 18, is substantially normal to the surface 17 of the measured body M. Also, a scanning direction 21 is defined, which is substantially parallel to the surface of the measured body M at least in the vicinity of the measurement site 18. The sensor S and the measured body M are movable relative to each other in both the measuring direction 20 and the scanning direction 21.

A first control means 22 is provided for controlling the relative movement of the sensor S inn the scanning direction 21 according to a predetermined scanning pattern, which can be for instance of the raster type. Drive means 23 for moving the sensor S in response to signals of the first control means 22 have also been indicated. Such first control means 22 and drive means 23 are known per se, for instance from the "scanning tunneling microscope" (STM) disclosed in U.S. Pat. No. 4,343,993 mentioned above.

A second control means 24 is provided for controlling the relative movement of the sensor S in the measuring direction 20 as a function of the detector signal delivered at the line 12 and for delivering a positioning signal to a drive means 25 for said movement. Such second control means 24 an drive means 25 are also known per se, for instance from the STM disclosed in U.S. Pat. No. 4,343,993 mentioned above.

The line 12 is connected to a circuit 26 which substantially is an amplifier and impedance converter adapted to deliver one or more usable signals which are derived from the detector signal delivered at the line 12. One such signal is delivered to the second control means 24 by a feedback line 12' connected thereto for providing the second control means 24 with a feedback of the detector signal, in order to keep the latter constant during a relative movement of the sensor S in the measuring direction 20. Thus, in this embodiment, the sensor S is moved to exactly follow any movement of the measurement site 18 of the measured body M in the measuring direction 20. The positioning signal delivered to drive means 25 by the second control means 24 is also delivered to a circuit 27, which substantially is an amplifier and impedance converter adapted to deliver at an output 27' thereof a value which is a function of the positioning signal. This value is representative of a displacement of the measurement site 18 of the measured body M in the measuring direction 20 while the surface of the measured body M is being scanned. Thus, the apparatus according to this first embodiment is particularly suitable for analyzing a surface and in particular its topography.

Figure 5:
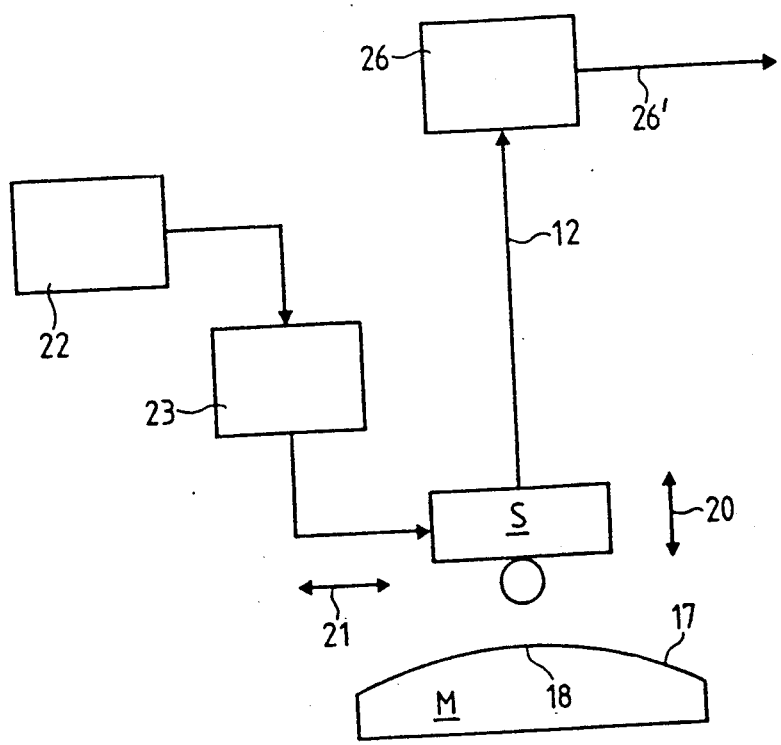

A second embodiment of a surface scanning apparatus according to the invention is schematically shown in FIG. 5. The only difference from the first embodiment of FIG. 4 substantially resides in that there is no feedback control of the sensor S in the measuring direction 20, while it is the circuit 26 which delivers at an output 26' thereof a value which is a function of the detector signal. This value is representative of the instant position of the surface of the measured body M in the measuring direction 20 while this surface moves for any reason such as thermal expansion or mechanical deformation. Thus, the apparatus according to this second embodiment is particularly suitable for analyzing surface deformation of a body.

Figure 6:
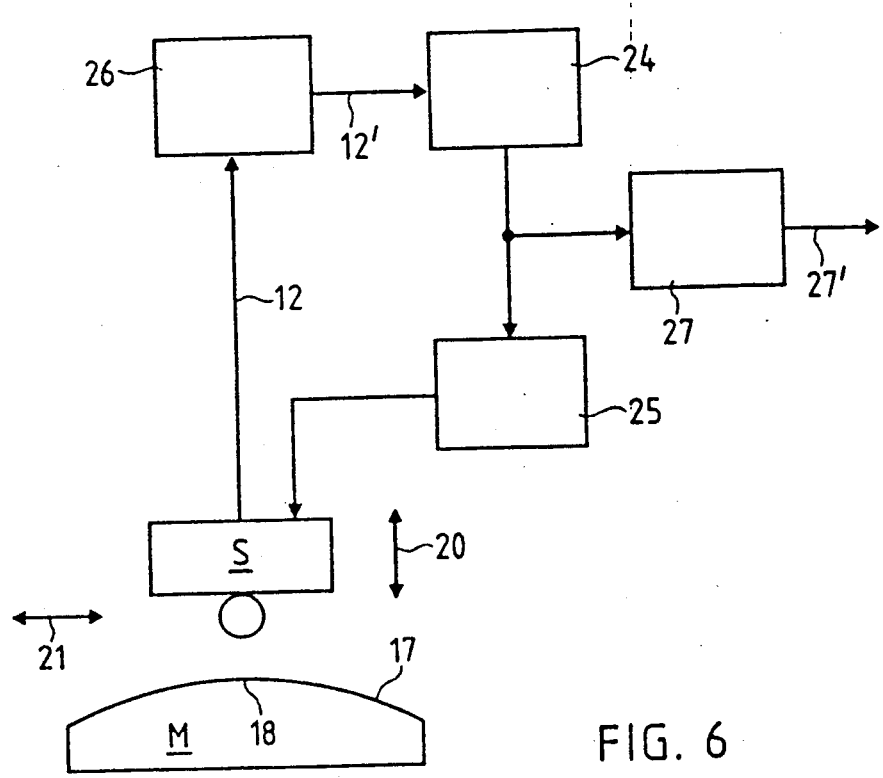

A third embodiment of a surface scanning apparatus according to the invention is schematically shown in FIG. 6. The only difference from the first embodiment of FIG. 4 substantially resides in that there is no control of the relative movement between the sensor S and the measured body M in the scanning direction 20. The value delivered at the output 27' is a function of the positioning signal and is representative of the position of the surface of the measured body M in the measuring direction 20 while this surface is moved for passing along the sensor S. Thus, the apparatus according to this third embodiment is particularly suitable as a contactless follower for reading a surface pattern of body M which performs a predetermined movement.

Figure 7:
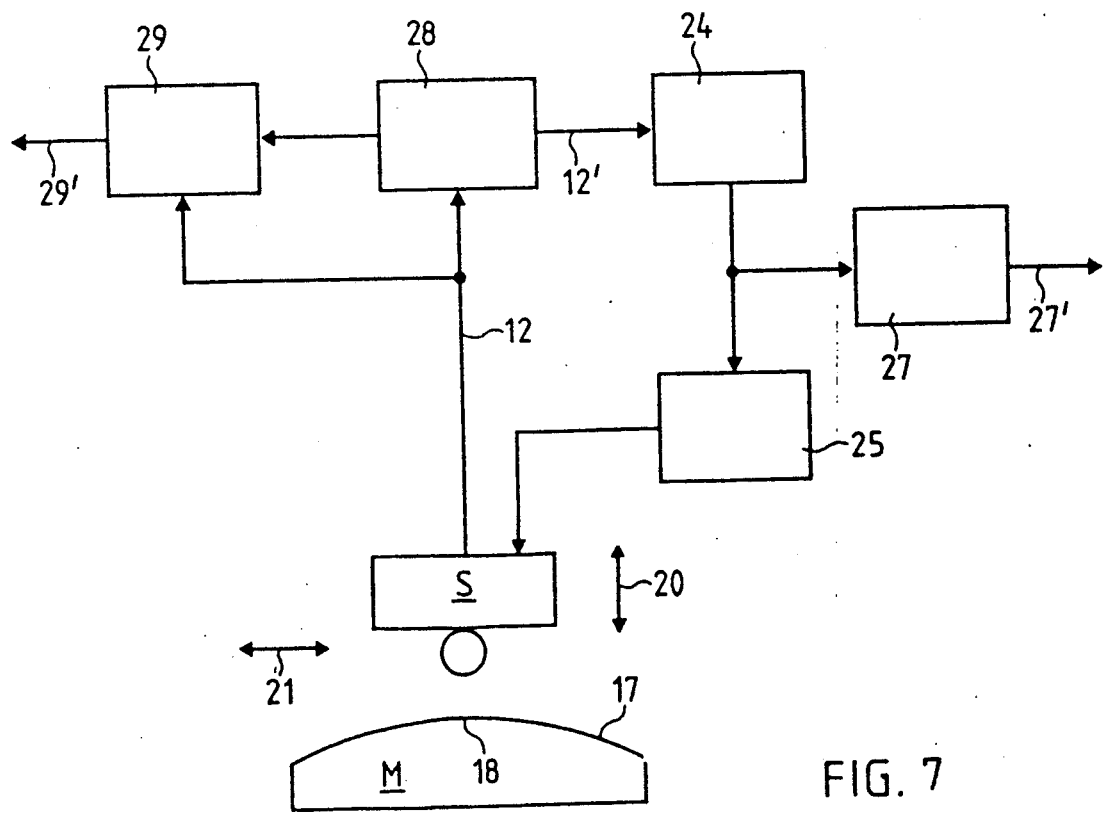

A fourth embodiment of a surface scanning apparatus according to the invention is schematically shown in FIG. 7. The difference between the third embodiment of FIG. 6 and that of FIG. 4 substantially resides in that instead of the circuit 26 there is provided a circuit 28 which, additionally to substantially being an amplifier and impedance converter equivalent to the circuit 26, is adapted to form, as an average over a predetermined time, a mean value of the detector signal delivered at the line 12, and to deliver this mean value not only to the second control means 24 by means of the line 12' but also to a substracting circuit 29 at a first input thereof. At a second input thereof the substracting circuit 29 also receives the detector signal delivered at the line 12. The substracting circuit 29 is adapted to form a value of an instant difference between the instant detector signal and the mean value signal averaged therefrom, and to deliver this value of an instant difference at an output 29'. The valve delivered at the output 29' is representative of the instant difference between respective instant and average positions of the surface of the measured body M in the measuring direction 20 while this surface is moved for passing along the sensor S. Thus, the apparatus according to tis fourth embodiment is particularly suitable as a contactless follower for reading a surface pattern of a body which performs a predetermined movement when the surface of this body is not perfectly plane, as may be the case for instance when reading a recording medium such as a disk.

What is claimed is:

1. An optical sensor for converting a distance value between a sensor and a body to be measured to a quantity of optical energy by using laser light of a predetermined wavelength and for converting said quantity of optical energy to an electrical value representative of said distance value, said sensor including a reference site, said body to be measured including a surface having a measurement site, said distance value being defined between the reference site of the sensor and the measurement site at the surface of the measured body located opposite the sensor and being small enough to be located, at a predetermined wavelength, in an optical near field of the reference site, the sensor comprising:
    a sensor body formed as a light waveguide for said laser light and having a light entrance site, a first light exit site for the light guided through the sensor body and a second light exit site for the light diffracted within the sensor body, said second light exit site being located at a first surface of the sensor body on a side thereof which faces away from the measured body,
    a detection particle acting as an antenna and located at a second surface of the sensor body between said light entrance site and said first light exit site and having a substantially convex and rounded off shape and a major dimension which is smaller than said predetermined wavelength, and
    a detector means for converting the optical energy of a light portion which leaves the sensor body at the second light exit site into an electrical detector signal,
    said sensor body being provided with a continuous thin film formed as a coating so as to substantially cover the detection particle and at least part of said second surface of the sensor body in the vicinity of the detection particle, said thin film having a thickness which is smaller than said predetermined wavelength.

2. Sensor according to claim 1, wherein the detector means is formed as an integral part of the sensor body.

3. Sensor according to claim 1, wherein the detector means is positioned at the sensor body adjacent to the second light exit site.

4. Sensor according to claim 1, and further including a further light waveguide, the detector means being connected to the second light exit site by said further light waveguide.

5. Sensor according to claim 1, wherein the detection particle has a major dimension of less than 500 nm.

6. Sensor according to claim 1, wherein the detection particle has a major dimension in the range 20 to 100 nm.

7. Sensor according to claim 1, wherein the detection particle is formed of a metal in which, at a predetermined wavelength, the excitation of plasmons or polaritons is possible.

8. Sensor according to claim 1, wherein the detection particle is formed of a dielectric material.

9. Sensor according to claim 1, wherein the detection particle is a latex spherule.

10. Sensor according to claim 1, wherein the thin film is formed of a metal in which, at a predetermined wavelength, the excitation of plasmons or polaritons is possible.

11. Sensor according to claim 7, wherein said predetermined wavelength is selected within the visible light spectrum and the metal is selected from the group consisting of gold, silver and copper.

12. Sensor according to claim 10, wherein said predetermined wavelength is selected within the visible light spectrum and the metal is selected from the group consisting of gold, silver and copper.

13. Sensor according to claim 10, wherein the thin film is formed of gold and has a thickness of less than 100 nm.

14. Sensor according to claim 1, wherein the detection particle has the shape of a sphere.

15. Sensor according to claim 1, wherein the detection particle has a shape of a cone.

16. Sensor according to claim 1, wherein the detection particle has the shape of a pyramid.

17. In a combination of an apparatus for scanning a surface of a measured body with a sensor for converting a distance value between the sensor and the measured body into optical energy by using laser light and converting optical energy into an electrical value and including a sensor body formed as a light waveguide and having a film coating, a detector particle acting as an antenna, and a detector means for conveying optical energy of the light which leaves said sensor body into a detector signal, wherein a measuring direction is defined which, in the vicinity of a measurement site of the body being measured, is substantially normal to the surface of the measured body, and a scanning direction is defined which is substantially parallel to the surface of the measured body, and wherein the sensor and the measured body are movable relative to each other in both said directions, the apparatus comprising:
 drive means connected to said sensor to position said sensor relative to the body being measured;
 first control means for controlling the relative movement of the sensor in the scanning direction according to a predetermined scanning pattern;
 second control means for controlling the relative movement of the sensor in the measuring direction as a function of a detector signal from said detector means and for delivering a positioning signal to said drive means for said movement;
 a feedback line for delivering to the second control means a feedback of the detector signal in order to keep the detector signal constant during the relative movement of the sensor in the scanning direction, and
 a circuit for delivering a measured value of a distance between said sensor and the surface to be scanned, said value being a function of the positioning signal.

18. In a combination of an apparatus for scanning a surface of a measured body with a sensor for converting a distance value between the sensor and the surface of the measured body into optical energy by using laser light and converting optical energy into an electrical value and including a sensor body formed as a light waveguide and having a film coating, a detector particle acting as an antenna, and a detector means for converting optical energy of the light which leaves said sensor body, into a detector signal, wherein a measuring direction is defined which, in the vicinity of a measurement site of the body being measured, is substantially normal to the surface of the measured body, and a scanning direction is defined which is substantially parallel to the surface of the measured body, and wherein the sensor and the measured body are movable relative to each other in said measuring direction while being fixed relative to each other in any direction normal to the measuring direction, the apparatus comprising:
 control means for controlling the relative movement of the sensor in the scanning direction according to a predetermined scanning pattern, and
 a circuit for delivering during a relative movement of the sensor in the scanning direction, a measured value of a variation of a distance between said sensor and the measured body, said value being a function of a detector signal of said detector means.

19. In a combination of an apparatus for scanning a surface of a measured body with a sensor for converting a distance value between the sensor and the surface of the measured body into optical energy by using laser light, and converting optical energy into an electrical value and including a sensor body formed as a light waveguide and having a film coating, a detector particle acting as an antenna, and a detector means for converting optical energy of the light which leaves said sensor body into a detector signal, wherein a measuring direction is defined which, in the vicinity of a measurement site of the measured body, is substantially normal to the surface of the measured body, and a scanning direction is defined which is substantially parallel to the surface of the measured body, and wherein the sensor and the measured body are movable relative to each other in both said directions, the apparatus comprising:
 a drive means connected to said sensor to position said sensor relative to said measured body,
 control means for controlling the relative movement of the sensor in the measuring direction in response to a detector signal from said detector means and for delivering a positioning signal to said drive means for said movement,
 a feedback line for delivering to the control means a feedback of the detector signal in order to keep the detector signal constant during a relative movement of the sensor in the measuring direction, and
 a circuit for delivering a measured value of a distance between said sensor and said measurement site, said value being a function of the positioning signal.

20. In a combination of an apparatus for scanning the surface of a measured body with a sensor for converting a distance value between the sensor and the measured body into optical energy by using laser light and converting optical energy into an electrical value and including a sensor body formed as a light waveguide and having a film coating, a detector particle acting as an antenna, and a detector means for converting optical energy of light which leaves said sensor body into a detector signal, wherein a measuring direction is defined which, in the vicinity of a measurement site of the measured body, is substantially normal to the surface of the measured body, and a scanning direction is defined which is substantially parallel to the surface of the measured body, and wherein the sensor and the measured body are movable relative to each other in both said directions, the apparatus comprising:

drive means connected to said sensor to position the sensor relative to said measured body, control means for controlling the relative movement of the sensor in the measuring direction as a function of a detector signal from said detector means and for delivering a positioning signal to said drive means for said movement, a first circuit for delivering an mean value signal representative of the value of a detector signal of said detector means, averaged over a predetermined time, a feedback line for delivering to the control means the mean value signal in order to keep said value signal constant during the relative movement of the sensor in the measuring direction, and a second circuit for delivering a measured value of a distance between said sensor and said measurement site of the surface of the body being measured, said value being a function of a difference between the detector signal and the mean value signal averaged therefrom.

21. Combination according to claim 17, for scanning the surface of a measured body which surface is convex, wherein said sensor body has a surface which faces said measured body and has at least one straight generatrix passing through a location of said surface of the sensor where the detection particle is located.

22. Combination according to claim 17, for scanning the surface of a measured body, which surface is substantially plane, wherein said sensor body has a surface which faces said measured body and is convex towards the measured body at least at a location of the surface of the sensor where the detection particle is located.

23. Combination according to claim 18, for scanning the surface of a measured body which surface is convex, wherein said sensor body has a surface which faces said measured body and is at least one straight generatrix passing through a location of said surface of the sensor where the detection particle is located.

24. Apparatus according to claim 18, for scanning the surface of a measured body which surface is substantially plane, wherein said sensor body has a surface which faces said measured body and is convex towards the measured body at least at a location of the surface of the sensor where the detection particle is located.

25. Combination according to claim 19, for scanning the surface of a measured body which surface is convex, wherein said sensor body has a surface which faces said measured body and has at least one straight generatrix passing through a location of said surface of the sensor where the detection particle is located.

26. Combination according to claim 19, for scanning the surface of a measured body, which surface is substantially plane, wherein said sensor body has a surface which faces said measuring body and is convex towards the measured body at least at a location of the surface of the sensor where the detection particle is located.

27. Combination according to claim 20, for scanning the surface of a measured body which surface is convex, wherein said sensor body has a surface which faces said measured body and has at least one straight generatrix passing through a location of said surface of the sensor where the detection particle is located.

28. Combination according to claim 20, for scanning the surface of a measured body, which surface is substantially plane, wherein said sensor body has a surface which faces said measured body and is convex towards the measured body at least at a location of the surface of the sensor where the detection particle is located.

29. Combination according to claim 17, wherein the laser light directed to enter the sensor body is p-polarized.

30. Combination according to claim 18, wherein the laser light directed to enter the sensor body is p-polarized.

31. Combination according to claim 19, wherein the laser light directed to enter the sensor body is p-polarized.

32. Combination according to claim 20, wherein the laser light directed to enter the sensor body is p-polarized.

* * * * *